Figure 1:
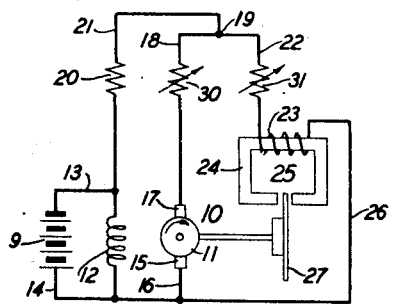

April 18, 1950  W. A. MARRISON  2,504,340
SPEED REGULATOR FOR ELECTRIC MOTORS
Filed Dec. 30, 1943

INVENTOR
W. A. MARRISON
BY
ATTORNEY

Patented Apr. 18, 1950

2,504,340

UNITED STATES PATENT OFFICE 2,504,340

SPEED REGULATOR FOR ELECTRIC MOTORS

Warren A. Marrison, Maplewood, N. J., assignor to Bell Telephone Laboratories, Incorporated, New York, N. Y., a corporation of New York Application December 30, 1943, Serial No. 516,199

5 Claims. (Cl. 318—303)

This invention relates to a speed regulator for dynamoelectric apparatus, and more particularly to a speed regulator including a magnetic brake adapted with a resistor having a non-linear resistance versus voltage characteristic whereby the effect of the magnetic brake is caused to vary in a non-linear manner.

Miniature direct current motors designed for shunt operation have notoriously poor regulation which may vary as much as 50 per cent with changes in load caused by variations of ambient temperature on the lubricants used in the load and/or with changes in the voltage of the power source energizing the motors. This is found to be the case when such motor is located in ambient temperature varying from (—)10 to (+)40° centigrade, and the voltage of the energizing source is varied approximately ±15 per cent relative to a certain normal operating value. Speed regulators of the electronic type are often unsuited to use with the above motors because such regulators involve particular power and space requirements; and those of the contacting or vibratory type are often unsuited because of the foregoing considerations coupled with possibilities of intense electrical interference. The present invention is concerned with a speed regulator for a miniature motor such as might, for example, be contained in mobile apparatus operating in relatively low and variable ambient temperature and embodying limited power and space facilities.

The main object of the invention is to provide for an electric motor a speed regulator of increased sensitivity and reduced bulk.

In one type of speed regulator used heretofore, the armature whose speed is to be regulated and the energizing winding of a magnetic brake operative upon the armature are applied in parallel across the terminals of a storage battery. As the voltage of the storage battery tends to vary, the amount of current flowing in the brake winding also tends to vary and thereby to cause corresponding variations in the counter-torque applied effectively to the motor armature. This tends to stabilize the motor at a certain normal speed under control of the stabilizing effect of the magnetic brake alone.

In a specific embodiment of the present invention, a manually variable resistance of a familiar linear resistance versus voltage characteristic is interposed in series in the circuit of the armature, and a further resistor having a pre-selected non-linear resistance versus voltage characteristic is connected in series in the circuit of the brake winding. The armature resistance serves to effect small adjustments in the armature speed; and in a proper design, the smallest value of such resistance that would serve this purpose should be used.

The operation of the specific embodiment of the present invention is as follows: As the voltage of the storage battery tends to vary, the effective resistance of the brake winding circuit tends to vary non-linearly and thereby to vary in like manner the effective amount of current flowing in the brake winding circuit. This tends to vary in the non-linear manner the development of the counter-torque in the magnetic brake, which torque tends to stabilize the motor speed at the normal value. Such stabilizing effect is approximately proportional to the product of the stabilizing effect of the usual magnetic brake and the factor by which the control current variation is increased by means of the non-linear resistor.

The invention will be readily understood from the following description taken together with the accompanying drawing, in which:

Fig. 1 is a schematic circuit diagram of a motor speed regulator adapted with a specific embodiment of the present invention; and Figs. 2, 3, 4 and 5 are curves illustrating action obtainable in Fig. 1.

Referring to Fig. 1, a direct current motor 10 comprises an armature 11 connected to a load, not shown, and a shunt field winding 12 which is connected across supply mains 13 and 14 of a storage battery 9. The lower brush 15 engaging one portion of the armature is connected over lead 16 to the supply main 14, while the upper brush 17 engaging the opposite portion of the armature is connected over lead 18, point 19, resistor 20 and lead 21 to the supply main 13. Extending from the point 19 is a lead 22 which is connected to one end of energizing winding 23 applied to a core 24 of a magnetic brake 25. The opposite end of the energizing winding is connected over lead 26 to the lead 16 and thereby to the supply main 14. Intermediate the opposite poles of the core 24 is positioned a disc 27 of conducting material arranged in the familiar manner to rotate with the armature.

In the operation of the portion of Fig. 1 above described, resistor 20 cuts down the voltage across the supply mains so that a suitable operating voltage is impressed across the armature whereby, for a normal supply voltage and a normal load, the armature is caused to rotate at a certain normal speed. When the battery voltage tends to increase, the armature speed tends to increase in response to the increased current flowing therethrough. At the same time, however, the increased battery voltage also tends to cause an increased amount of current to flow in the brake winding whereby the braking counter-torque produced by the magnetic brake tends to increase. This tends to stabilize the armature substantially at the normal speed. When the battery voltage tends to decrease, the opposite action takes place, and tends to cause the armature speed to stabilize substantially at the normal value.

When the load tends to increase, the armature tends to slow down but at the same time tends to draw an increased amount of current therethrough. This tends to decrease the amount of current flowing in the brake winding and thereby decrease correspondingly the effect counter-torque produced in the magnetic brake. This tends to stabilize the armature speed substantially at the normal value. When the load tends to decrease, the opposite action takes place and tends to cause the armature speed to stabilize substantially at the normal value.

In accordance with the present invention, a manually variable resistor 30 of the usual linear voltage versus resistance characteristic is connected in the lead 18 in series in the circuit extending from the point 19 to the armature, and a resistor 31 having a negative resistance versus voltage characteristic is connected in the lead 22 in series in the circuit extending from the point 19 to the energizing winding of the magnetic brake.

In the operation of the present invention, manual adjustments of the resistor 30 serve to vary the effective relative amounts of current flowing in the armature and the energizing winding of the magnetic brake, and hence may be used for adjusting the normal operating speed of the armature. In one arrangement, the speed of the armature was adjustable in the manner illustrated in Fig. 3. As previously mentioned, the smallest value of this resistance for the foregoing purpose should be used.

Figure 4:
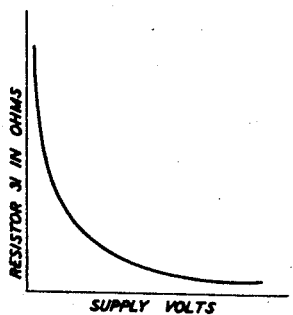

When the battery voltage tends to increase, the effective resistance of the non-linear resistor 31 tends to decrease in the non-linear manner shown in Fig. 4 thereby causing a current increasing in the non-linear manner to be shunted through the energizing winding of the magnetic brake. This tends to increase, in the non-linear manner, the counter-torque developed in the magnetic brake whereby the armature is caused to remain at substantially the normal speed. When the battery voltage tends to decrease, the effective resistance of the resistor 31 tends to increase in the non-linear manner shown in Fig. 4 whereby the opposite action is caused to take place so that the armature speed is again caused to remain substantially at the normal speed.

The controlling effect of the combination of the magnetic brake and non-linear resistor 31 is such that the amount of current flowing in the energizing winding of the magnetic brake is caused to vary by a greater percentage than the variation of the voltage of the power supply. The resulting controlling effect is substantially proportional to the product of the normal controlling effect of the magnetic brake and the factor by which the current change exceeds the voltage change in the non-linear resistor 31. Due to the shunting effect of the resistor 31, the voltage applied to the armature varies proportionally less than the voltage applied over the lead 21 to the resistor 20. This reduces the amount of controlling effect required for a given applied voltage variation, and thus effectively increases the range and sensitivity of the overall control.

Figure 5:
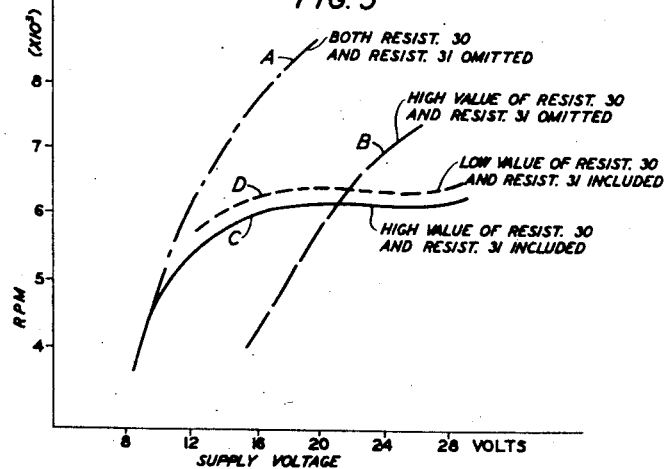

Referring to Fig. 5, dot-dash curve A illustrates the speed versus supply voltage characteristic of the armature of Fig. 1 connected in the usual way with the armature and shunt field applied directly across the power supply. The broken line curve B shows the same characteristic of the armature of Fig. 1 with the resistor 31 omitted but with the effective resistance of the resistor 30 adjusted to a relatively high value to bring about a substantial reduction in armature speed to approximate the value desired for control. The full line curve C illustrates the speed control characteristic of the circuit illustrated in Fig. 1 with the resistor 30 adjusted substantially to the same extent as in the case of curve B, but with, in addition, the inclusion of the variable resistor 31 in the braking circuit; and shows the armature speed adjusted substantially to a value of 6,000 revolutions per minute for a terminal battery voltage of approximately 21 volts. The dashed line curve D in Fig. 5 represents the circuit of Fig. 1 arranged as in the case for curve C in Fig. 5 except the resistor 30 is adjusted to a relatively low value. In the curves A, B, C and D, the armature was assumed to have approximately the same normal load. In the complete circuit of Fig. 1 including both resistors 30 and 31, it was found that the motor speed could be substantially maintained within a variation of two per cent of a normal speed of 6,000 revolutions per minute for a battery voltage varying approximately from 18 to 24 volts, and for starting up the motor in ambient temperature varying approximately from −10° centigrade to +25° centigrade; and after the motor has warmed up; as in the case of continuous operation, the speed regulation could be substantially maintained within 1 per cent variation speed of 6,000 revolutions per minute approximately for a ±15 per cent variation of battery voltage, with reference to the normal battery voltage of 21 volts.

Figure 2:
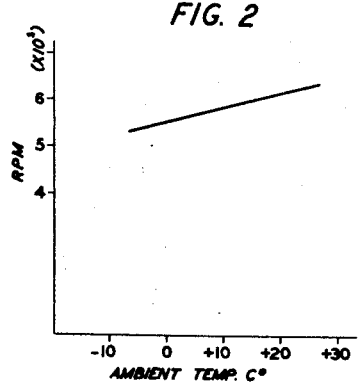
Figure 3:
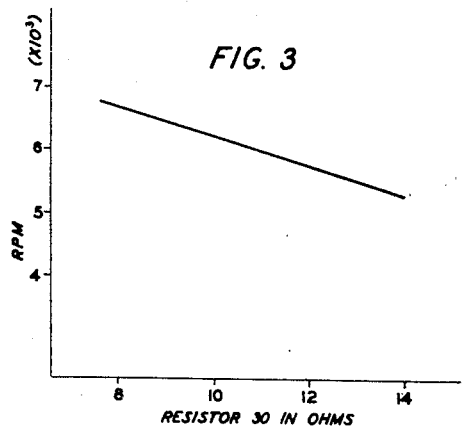

Fig. 2 shows the speed at which the motor in Fig. 1 starts after long standing at various ambient temperatures. As the greatest change in the rate of the motor speed, when the motor is operated at low temperatures, occurs at the beginning of the operation because of the condition of the long-standing lubricant, the stability of the regulator in Fig. 1 can be improved by allowing the motor a brief warming-up period.

While the present invention has been illustrated with reference to a shunt-type motor, it is not necessarily limited thereto, and may be expeditiously employed with other types of motors such, for example, as those of the permanent magnet type.

What is claimed is:

1. A speed-regulated motor system comprising an electric motor having an armature, electrical connections for applying motor operating voltage to said armature, a magnetic brake for said armature, and a circuit connected in parallel with said armature for supplying operating current to said magnetic brake, said circuit including a non-linear voltage responsive resistance element for varying the operating current supplied to said magnetic brake in substantially greater than direct proportion to concomitant variations in the voltage across said armature whereby the motor speed tends to be stabilized.

2. In combination with an electric motor having an armature and a source of voltage connected to said armature, a speed regulator for said armature comprising a magnetic brake coupled to said armature and including an operating winding electrically connected in parallel with said armature for controlling the speed of said armature, and a non-linear voltage responsive resistance element connected in series between said winding and said armature, said serially connected resistance and winding being connected in parallel with said armature, said element having a non-linear effective resistance versus voltage characteristic proportioned to vary the amount of current in said operating winding by a substantially greater percentage than concomitant variations in the voltage across said armature.

3. A system in accordance with claim 1 including an adjustable resistance element interposed in said electrical connections in series with said armature whereby said circuit is connected in parallel with said armature and adjustable resistance element and whereby the speed at which said motor tends to be stabilized can be adjusted.

4. In combination with an electric motor having an armature and a source of voltage connected to said armature, a speed regulator for said armature comprising a first resistor in series relation to said source and armature, a magnetic brake coupled to said armature and including an operating winding electrically connected in parallel with said armature for controlling the speed of said armature, and a non-linear resistance element connected in series between said winding and said armature, said element being of the type in which the effective resistance thereof is less than inversely proportional to the voltage applied across the terminal thereof, said serially connected element and winding being connected in parallel with said armature.

5. In combination with an electric motor having an armature and a source of voltage connected to said armature, a speed regulator for said armature comprising a first resistor in series relation to said source and armature, a magnetic brake coupled to said armature and including an operating winding electrically connected in parallel with said armature for controlling the speed of said armature, and a non-linear resistance element the resistance of which increases as the voltage across the terminals thereof decreases connected in series between said winding and said armature, said serially connected resistance and winding being connected in parallel with said armature.

WARREN A. MARRISON.

REFERENCES CITED

The following references are of record in the file of this patent:

UNITED STATES PATENTS

| Number | Name | Date |
|---|---|---|
| 1,323,761 | Hall | Dec. 2, 1919 |
| 1,961,940 | O'Hagan | June 5, 1934 |
| 2,086,910 | Hansell | July 13, 1937 |
| 2,351,508 | Hamilton | June 13, 1944 |
| 2,354,583 | Eddy | July 25, 1944 |